(12) United States Patent
Moore

(10) Patent No.: US 7,552,699 B2
(45) Date of Patent: Jun. 30, 2009

(54) TRANSPONDING OF A SIGNAL USING THE SAME ANTENNA

(75) Inventor: William P. Moore, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 86 days.

(21) Appl. No.: 11/437,258

(22) Filed: May 19, 2006

(65) Prior Publication Data

US 2006/0207520 A1 Sep. 21, 2006

Related U.S. Application Data

(63) Continuation-in-part of application No. 11/254,155, filed on Oct. 19, 2005.

(60) Provisional application No. 60/620,469, filed on Oct. 20, 2004.

(51) Int. Cl.
*A01K 15/02* (2006.01)
(52) U.S. Cl. ..................... 119/719; 119/721
(58) Field of Classification Search ............. 119/712, 119/718, 719, 721, 859, 908, 720; 340/573.3
See application file for complete search history.

(56) References Cited

U.S. PATENT DOCUMENTS

| | | | |
|---|---|---|---|
| 2,800,104 A | 7/1957 | Cameron et al. | 119/29 |
| 3,777,712 A | 12/1973 | Gardner et al. | 119/29 |
| 3,980,051 A | 9/1976 | Fury | 119/29 |
| 4,675,656 A | 6/1987 | Narcisse | 340/539 |
| 4,745,882 A | 5/1988 | Yarnall, Sr. et al. | 119/29 |
| 4,967,695 A | 11/1990 | Giunta | 119/29 |
| 5,067,441 A | 11/1991 | Weinstein | 119/29 |
| 5,408,956 A | 4/1995 | Quigley | 119/720 |
| 5,559,498 A | 9/1996 | Westrick et al. | 340/573 |
| 5,666,908 A | 9/1997 | So | 119/720 |
| 5,769,032 A | 6/1998 | Yarnall, Sr. et al. | 119/721 |
| 5,815,077 A | 9/1998 | Christiansen | 340/573 |
| 6,019,066 A | 2/2000 | Taylor | 119/720 |
| 6,170,439 B1 | 1/2001 | Duncan et al. | 119/720 |
| 6,283,065 B1 * | 9/2001 | Shorrock et al. | 119/863 |
| 6,374,778 B1 | 4/2002 | Glussich | 119/859 |
| 6,549,133 B2 | 4/2003 | Duncan et al. | 340/573.3 |
| 2004/0235497 A1 | 11/2004 | Zekavat | 455/456.1 |
| 2004/0236193 A1 | 11/2004 | Sharf | 600/302 |

OTHER PUBLICATIONS

U.S. Appl. No. 60/598,044, filed Aug. 2, 2004 by Donald K. Belcher, see 3 pages of the specification.*

* cited by examiner

*Primary Examiner*—T. Nguyen
(74) *Attorney, Agent, or Firm*—Pitts & Brittian, P.C.

(57) ABSTRACT

An animal behavior modification system including a collar, a receiver device and a transponder. The receiver device is attached to the collar, the receiver device having a receiver circuit and a stimulation circuit. The transponder is in communication with the receiver device. The transponder is positioned proximate to the receiver device. The transponder includes a signal transmitter; and an antenna intermittently electrically connectable to the signal transmitter. The signal transmitter wirelessly communicating to the receiver circuit of the receiver device.

5 Claims, 4 Drawing Sheets

TRANSPONDING OF A SIGNAL USING THE SAME ANTENNA

CROSS REFERENCE TO RELATED APPLICATIONS

This is a continuation-in-part of U.S. patent application Ser. No. 11/254,155, entitled "CLIP-ON TRANSLATOR FOR AN ANIMAL CORRECTION COLLAR", filed Oct. 19, 2005; which is a non-provisional application based upon U.S. provisional patent application Ser. No. 60/620,469, entitled "CLIP-ON TRANSLATOR FOR AN ANIMAL CORRECTION COLLAR", filed Oct. 20, 2004.

BACKGROUND OF THE INVENTION

1. Field of the Invention

The present invention relates to a correction collar system, and, more particularly, to a device to expand the functionality of an animal correction collar.

2. Description of the Related Art

Stimulation devices are used for the modification of the behavior of an animal. The stimulation device is often associated with a collar worn by the animal and is provided to improve the behavior of the animal. Some stimulation devices include twin electrodes that are positioned against the skin of an animal, which deliver an electrical stimulus to modify the behavior of the animal. The stimulus can also be in the form of a vibration, an audible noise or other sensory stimulation to gain the attention of the animal.

Stimulation devices have been developed for specific functions. For example, some stimulation collars respond to a boundary transmission system, which provides a stimulus to the animal as the animal approaches the boundary. This type of device is also understood to be a containment type system. In a containment type system the boundary is defined by a buried radio frequency transmitting wire that can be placed along a boundary of a property. A confinement system may produce an audible tone to warn the animal that it is approaching the boundary and that if the animal continues toward the boundary further stimulus is applied to the animal. In a similar fashion a transmitter may be positioned proximate to an area, such as a flower garden, with the system transmitting to the receiver worn by the animal, which again provides a warning and then a stimulus as the animal approaches the flower garden. This type of system is known as an avoidance system.

What is needed in the art is a system that can expand the functionality of a containment and/or avoidance type system.

SUMMARY OF THE INVENTION

The present invention provides a transponder that expands the functionality of a containment and/or avoidance type of animal modification system.

The invention comprises, in one form thereof, an animal behavior modification system including a collar, a receiver device and a transponder. The receiver device is attached to the collar, the receiver device having a receiver circuit and a stimulation circuit. The transponder is in communication with the receiver device. The transponder is positioned proximate to the receiver device. The transponder includes a signal transmitter; and an antenna intermittently electrically connectable to the signal transmitter. The signal transmitter wirelessly communicating to the receiver circuit of the receiver device.

An advantage of the present invention is that the functionality of a containment or avoidance collar system can be expanded to have additional functionality.

Another advantage of the present invention is that it expands functionality without requiring the purchase of a new collar system.

Yet another advantage of the present invention is that the transponder can be removed from the collar, thereby allowing the transponder to be installed on another collar worn by another animal.

Still yet another advantage of the present invention is that the transponder translates a command from a newer transmitter into a command understood by an older receiver.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
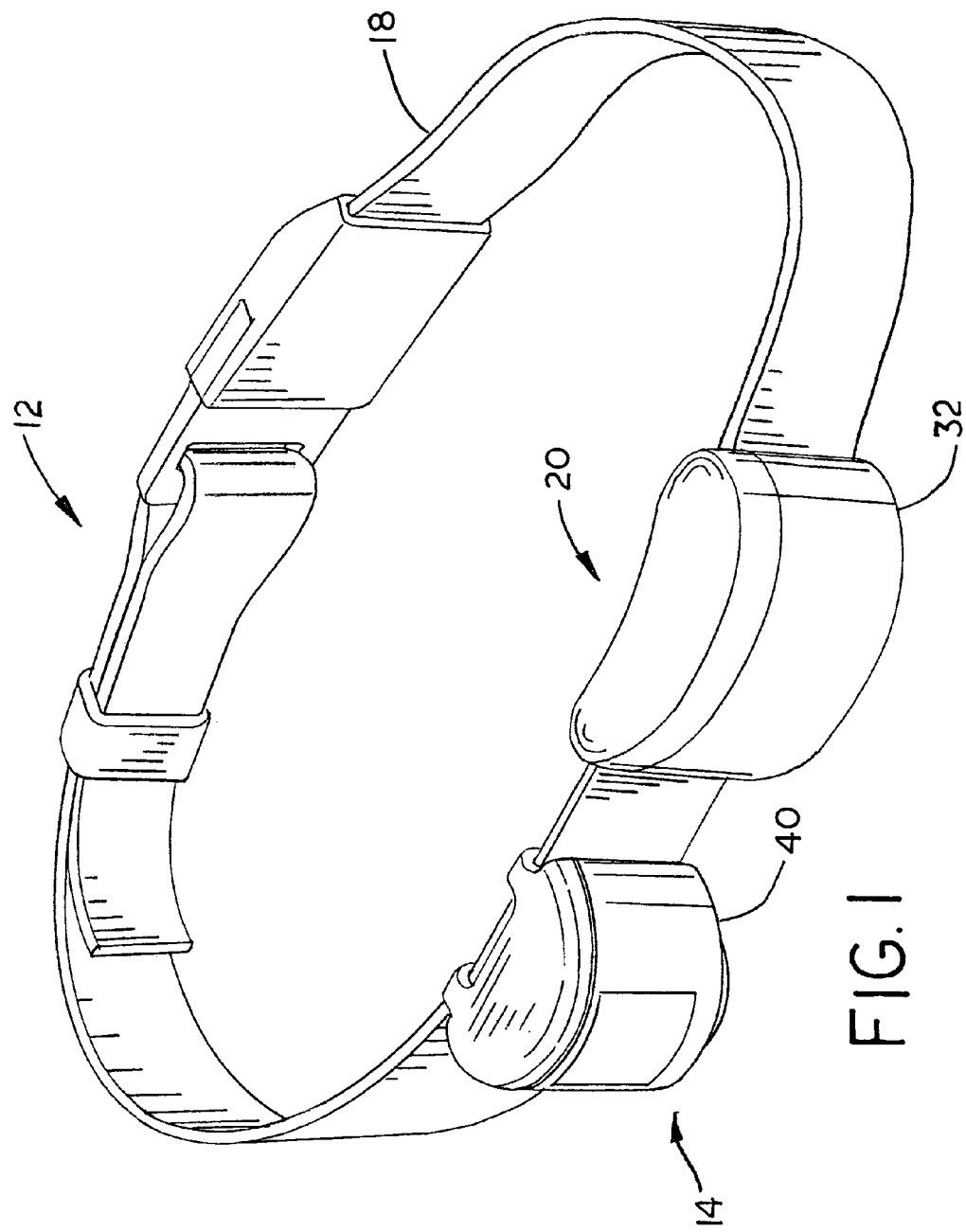
FIG. 1 is a perspective view of an embodiment of an animal collar system including a transponder utilized in the present invention.
Figure 2:
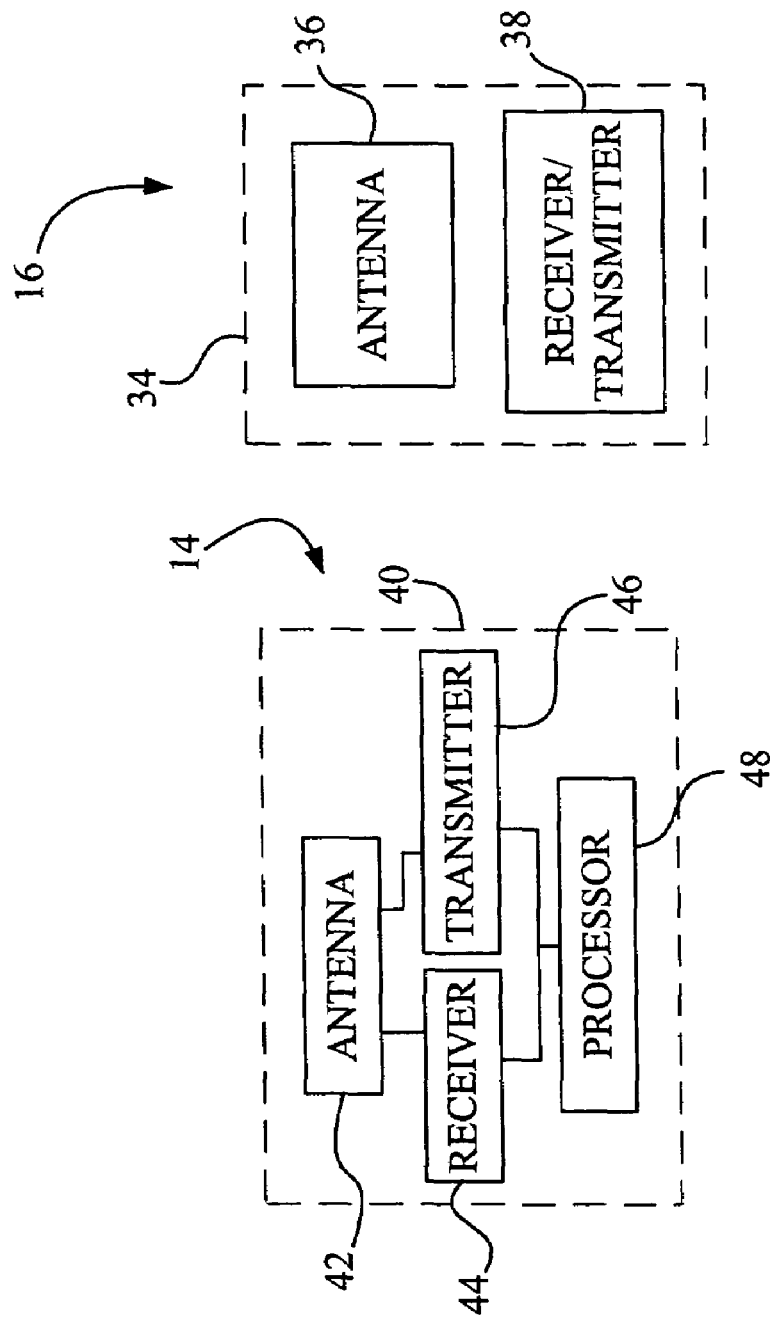
FIG. 2 is a schematicized illustration of the elements of the animal control system, including those depicted in FIG. 1.

Referring now to the drawings, and more particularly to FIGS. 1 and 2, there is shown an animal behavior modification system 10 including an animal stimulation system 12, a transponder 14 and a transceiver 16. Animal stimulation system 12 includes a collar 18 and a receiver device 20.

Receiver device 20 includes electrodes 22, an antenna 24, a receiver/transmitter 26, a control 28, a high voltage circuit 30 and a housing 32. Receiver device 20 provides a stimulation to an animal wearing animal stimulation system 12 in the event the animal approaches a boundary transmitter. An initial stimulation may be in the form of an audio signal, thereby warning the animal that it is approaching a boundary. If the animal persists in approaching the boundary a further stimulation may be provided by way of electrodes 22 to the skin of the animal. Antenna 24 receives a signal indicating that the boundary condition is approaching. Receiver/transmitter 26, which may just be a receiver circuit 26 receives a signal and provides information to control 28 for the determination if high voltage circuit 30 should be activated. High voltage circuit 30 is connected to electrodes 22 to provide an electrical stimulation to the animal. Receiver circuit 26 may additionally have a transmitting function, which would transmit information from animal stimulation system 12 to another receiver.

Transceiver 16 includes a housing 34, an antenna 36 and a receiver/transmitter 38. Transceiver 16 may be considered to be a handheld device that sends commands to an animal training device. For clarity in the understanding of the present invention it will be assumed that transceiver 16 transmits a signal that is not of the type of signal, which animal stimulation system 12 would process or respond to. A signal from transceiver 16 is interpreted by transponder 14, which then rebroadcasts an appropriate signal to receiver device 20.

Figure 3:
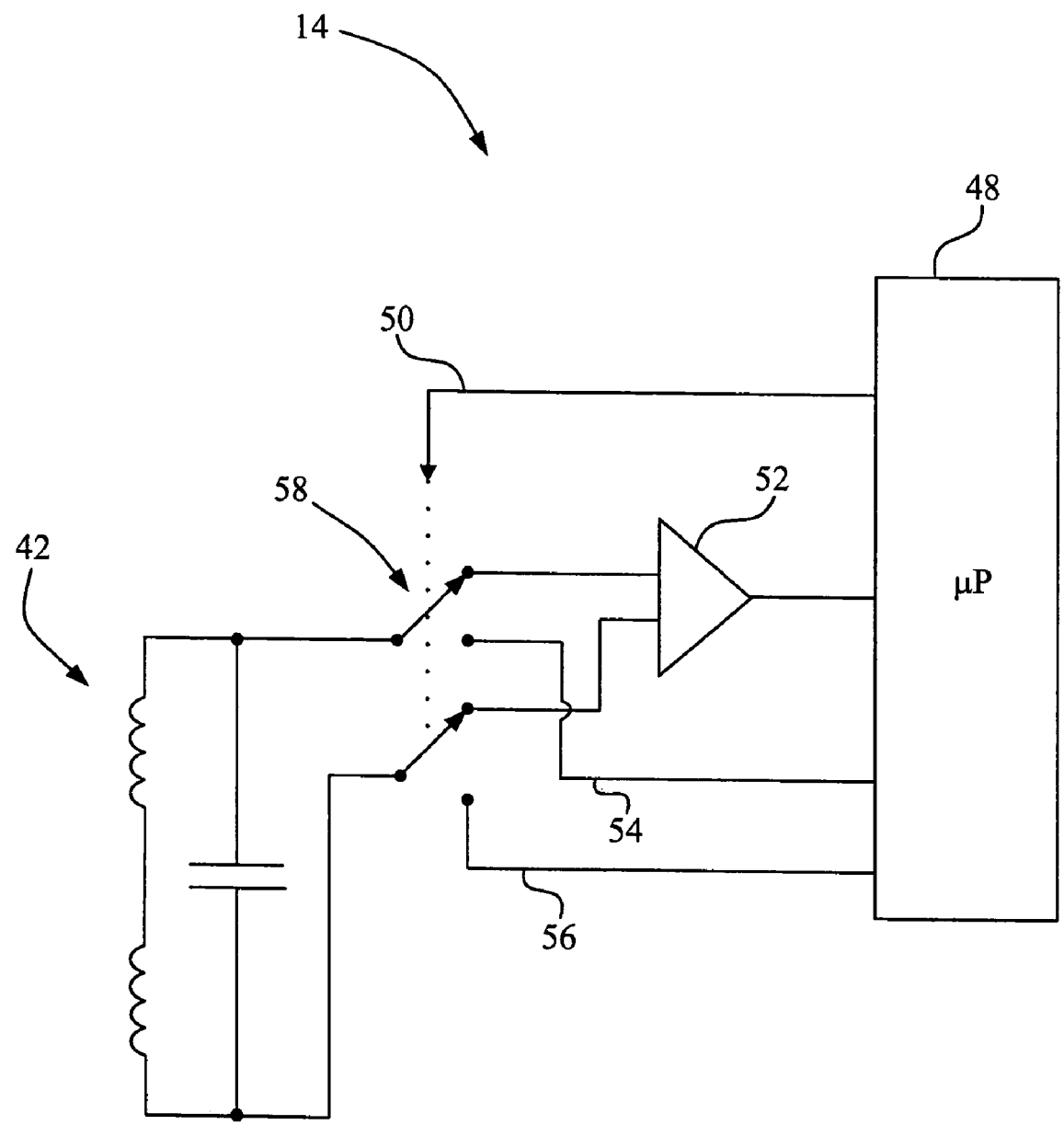
FIG. 3 is a functional schematic of the transponder of FIGS. 1 and 2.

Now, additionally referring to FIG. 3, there are shown further details of transponder 14, which includes a housing 40, an antenna 42, a receiver 44, a transmitter 46 and a processor 48. A command transmitted from transceiver 16, which may be in the format of an advanced command, is received by receiver 44 by way of antenna 42. Information of the command from transceiver 16 is then processed by processor 48. Processor 48 is programmed to alter the command issued by transceiver 16 into a command, to which receiver device 20 can adequately respond. For example, transceiver 16 may be activated by a user to warn the animal to stop. This command is received by transponder 14 and is reinterpreted to transmit a signal to receiver device 20 to cause receiver device 20 to issue an audible tone. Processor 48 provides information to transmitter 46 that it then broadcasts as a signal on antenna 42, which is then received by receiver circuit 26 by way of antenna 24. In a like manner transceiver 16 may issue a command to apply electrical stimulation to the animal, which is received by transponder 14 and passed onto receiver device 20 and high voltage circuit 30 is activated causing a stimulation to the animal by way of electrodes 22. This advantageously allows a confinement type collar to be utilized by a training transceiver 16, by way of transponder 14 associated with receiver device 20. Transponder 14 may be attached to collar 18 or to receiver device 20 itself.

Transmit/receive control line 50 controls a switch 58 that switches transponder 14 from a receive mode to a transmit mode. This advantageously allows the utilization of a single antenna 42 in transponder 14. Processor 48 keeps switch 58 in a default mode of receive. Upon the need for processor 48 to transmit a signal, transmit/receive control line 50 is activated causing switch 58 to switch from receiver 52 to transmitter lines 54 and 56. In the receive mode antenna 42 is connected to receiver amplifier 52, which provides a signal to processor 48 that it receives from either transceiver 16 or animal stimulation system 12. Processor 48 determines that a proper command has been received by way of receiver 52 the information received is processed and retransmitted by switching switch 58 to transmit lines 54 and 56. Transmit lines 54 and 56 can be understood to represent two transmitters. Normally only one transmitter is activated by keeping either transmitter A line 54 or transmitter B line 56 in a high impedance mode. This allows processor 48 to transmit either to transceiver 16 or to animal stimulation system 12 with different formats of information, signal composition and power levels. For example, transmitting to receiver device 20, which for purposes of clarity will be understood to relate to transmit A line 54, can be done at a low power level due to the proximity of transponder 14 to receiver device 20. Conversely transmitting information to transceiver 16 occurs by way of transmit B line 56, which is done at a higher power level, since transceiver 16 may be at some distance from transponder 14.

Figure 4:
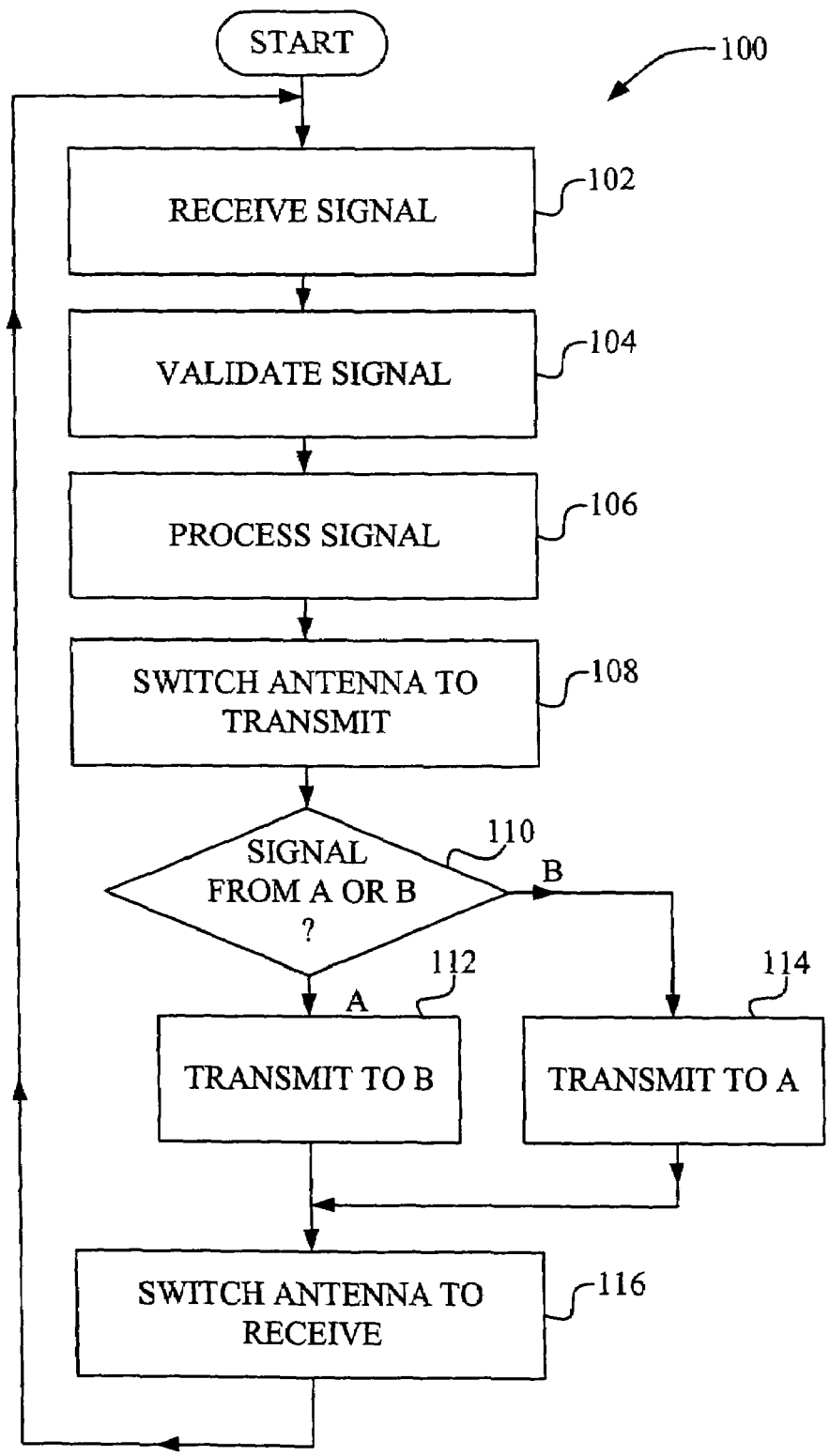
FIG. 4 depicts a method utilized by the transponder of FIGS. 1-3.

Now, additionally referring to FIG. 4 there is shown a method 100 utilized by transponder 14 to determine which transmitter to utilize in sending out a signal. Transponder 14 receives a signal at step 102, which may be from either transceiver 16 or receiver device 20. The signal is validated, at step 104, by comparing the signal to expected signals received from a transceiver 16 or receiver device 20. The information from the signal is processed, at step 106, to produce the information that can be sent on to either transceiver 16 or receiver device 20. Information received in the method can be identical to the information that is sent by way of the method. Once the information is prepared for transmitting, antenna 42 is switched, at step 108, to transmit lines 54 and 56 by way of the activation of transmit/receive control line 50 causing switch 58 to switch antenna 42 to lines 54 and 56. At step 110, processor 48 has determined whether the received signal was from A, which is understood to be receiver device 20 or B, which is understood to be from transceiver 16. If the signal originated at A the information is then transmitted to B at step 112. Conversely if the information was received from B then the information is transmitted to A at step 114. Once the information has been transmitted control line 50 causes switch 58 to revert to the default receive mode at step 116. Method 100 then repeats by returning to step 102.

Advantageously the transponder of the present invention interprets the origin of the signal and transmits the information received thereby to another receiver. This can be understood to include processing signals with different carrier frequencies or formats. For example, a digitally encoded signal may be transmitted on a first carrier frequency from transceiver 16 and transponder 14 then transmits an analog signal by way of a second carrier frequency to receiver device 20. Information can be relayed in both directions if receiver device 20 has a transmitter to transmit information to transponder 14. Even if receiver device 20 does not have a transmitter, information relative to the functioning of transponder 14 can be transmitted to transceiver 16.

It is to be understood that power is provided to transponder 14 by an internal power source, which is not shown. Further, transponder 14 is connected to collar 18 by any of various methods.

Further advantages of the present invention include the ability to expand the functionality of a containment or avoidance collar system, thereby making it available for us with an advanced training transmitter. The transmission range of the transponder can be relatively short perhaps just a few inches to about one foot. The antenna is multiplexed to reduce space and cost in transponder 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transponder for use with an animal behavior modification system, the animal behavior modification system having a receiver device and a transceiver, the receiver device being adapted to be attached to a collar, the transponder comprising:

a signal receiver;

a signal transmitter; and at least one antenna being at least intermittently electrically connected to said signal receiver and said signal transmitter, said signal receiver being adapted to receive a first signal transmitted by the transceiver, the first signal being indicative of a command actionable by the receiver device, the receiver device being irresponsive to the first signal, said signal transmitter transmits a second signal in response to said signal receiver receiving the first signal, the second signal being indicative of the command actionable by the receiver device, the receiver device being adapted to receive the second signal, the receiver device executes the command in response to receiving the second signal.

2. The transponder of claim 1, wherein said signal receiver receives a first information indicative of the command and said signal transmitter transmits a second information indicative of the command to the receiver device.

3. The transponder of claim 2, wherein said first information is carried by way of the first signal, said second information being transmitted by said signal transmitter by way of the second signal.

4. The transponder of claim 3, wherein said first information is identical to said second information.

5. The transponder of claim 2, further comprising a controller that switches said at least one antenna from being electrically connected to said signal receiver to being electrically connected to said signal transmitter, with said at least one antenna normally being electrically connected to said signal receiver.

* * * * *